United States Patent [19]

Masuda

[11] 4,304,612

[45] Dec. 8, 1981

[54] METHOD OF TREATMENT TO REMOVE HARMFUL MATERIAL FROM ELECTRIC PRODUCTS IMPREGNATED WITH POLY-CHLORINATED-BIPHENYL

[75] Inventor: Takehiko Masuda, Yokosuka, Japan

[73] Assignee: Fuji Electric Company, Ltd., Kanagawa, Japan

[21] Appl. No.: 195,791

[22] Filed: Oct. 10, 1980

[30] Foreign Application Priority Data

Dec. 19, 1979 [JP] Japan ................................ 54-164982

[51] Int. Cl.$^3$ .............................................. C23F 7/06
[52] U.S. Cl. ...................................... 148/6.3; 134/19
[58] Field of Search ............ 134/19; 148/6.3, 11.5 A, 148/13; 432/13, 18, 23

[56] References Cited

U.S. PATENT DOCUMENTS 3,650,830  3/1972  Mathis .............................. 134/19

OTHER PUBLICATIONS

Kawamura, Chem. Abs., 85:181908a (1976).

Primary Examiner—Ralph S. Kendall
Attorney, Agent, or Firm—Brumbaugh, Graves, Donohue & Raymond

[57] ABSTRACT

A method is provided for removing the harmful material from electrical products such as capacitors prior to their disposal. Poly-chlorinated-biphenyl is removed from electrical products such as capacitors by thermal decomposition.

2 Claims, No Drawings

METHOD OF TREATMENT TO REMOVE HARMFUL MATERIAL FROM ELECTRIC PRODUCTS IMPREGNATED WITH POLY-CHLORINATED-BIPHENYL

BACKGROUND OF THE INVENTION

This invention relates to a method of treatment useful in removing the harmful material from electrical products prior to their disposal. This invention is useful for example in treating a capacitor which is a roll of aluminum foil conductor and insulating paper impregnated with poly-chlorinated-biphenyl.

Poly-chlorinated-biphenyl (hereinafter referred to as PCB), a material frequently used in electrical products such as capacitors because of its dielectric strength, is hazardous to the environment. In order to safely dispose of electrical products which contain PCB, various well-known techniques are utilized to remove the PCB from the products. Thermal decomposition, radioactive decomposition, fermentative decomposition, reaction with sodium hydroxide at a high temperature, ultraviolet light decomposition, or decomposition by heat and a peroxide or sulfur are well-known techniques for treating liquid PCB. Notwithstanding the techniques which employ thermal decomposition, these techniques are not suitable for treating a roll of metal foil and paper which has been impregnated with PCB.

In removing harmful material from an electrical apparatus impregnated with PCB by thermal decomposition, the oil is first released from the body of the product and the body is broken into pieces. The pieces are then washed or dry distilled. If the washing or dry distillation removes all the PCB from the product, thermal treatment is not required prior to the product's disposal.

It is, however, practically impossible for conventional washing or dry distillation to completely remove all the harmful material from a roll of metal foil and paper such as a capacitor which has been impregnated with PCB. Hence, a final step of thermal treatment is usually required.

It is well known in the art that the complete thermal decomposition of PCB requires heating at a temperature of about 1200° C., preferably 1400° C. or more. The known methods for the thermal decomposition of PCB in electrical products such as capacitors possess many drawbacks. Heating electrical products at temperatures of 1200° C. or more requires a heating device of large capacity, massive thermal insulation and if gas is used, equipment for a gas supply. Heating at a high temperature necessarily requires a large quantity of electrical energy or fuel which results in a high operating cost. Heating devices also require a long time to reach the desired temperature. Since the relationship between temperature and time is not linear in heating devices, a rise of 100° C. between 1000° C. and 1100° C. requires a much greater time than the same temperature rise between 500° C. and 600° C., although it depends on the capacity of the heat source and the adequacy of the thermal insulation. Therefore, at high temperatures the efficiency of the heating devices declines greatly.

The object of this invention is to eliminate the drawbacks stated above while removing the harmful material from an electrical product. In particular this invention is useful in treating a roll of aluminum foil conductor and insulating paper such as a capacitor which has been impregnated with PCB.

SUMMARY OF THE INVENTION

It has now been found that harmful material can be removed from electrical products containing aluminum foil and insulating paper impregnated with poly-chlorinated-biphenyl which comprises burning or dry distilling the product in the absence of oxygen to a temperature of about 350° C. to 1200° C. and subsequently exposing the heated product to oxygen or a mixture of gases containing oxygen in order that the aluminum oxidizes rapidly generating temperatures of about 1800° C.

DETAILED DESCRIPTION OF THE INVENTION

The invention is based on the fact that PCB undergoes thermal decomposition when it is exposed to a sudden elevation in temperature. The rapid oxidation of aluminum in a rolled electrical product such as a capacitor does not occur when it is gradually heated in air or in an atmosphere containing oxygen. As the electrical product is gradually heated in air, the insulating paper carbonizes at about 250° C., and it ignites at about 600° C. or 700° C. The aluminum foil undergoes oxidation on its exterior surface and on its interior surface, such that at a temperature which exceeds its melting point the aluminum is partially liquified. Continued heating produces only the further oxidation of the aluminum foil. The PCB remains in the carbonized insulating paper.

In order to effect the rapid oxidation of the aluminum foil, the invention requires the burning or dry distillation of the electrical product under such conditions that the aluminum foil does not undergo complete oxidation. Carbonization is necessary to prevent the insulating paper from igniting and thus hindering the rapid oxidation of the aluminum foil. In order to control the reaction, the oxygen in the atmosphere in the burning or dry distillation step is regulated to prevent the complete oxidation of the aluminum foil.

The removal of PCB from electrical product requires two steps. First, the product is heated, in a container which lacks oxygen. After the temperature of the electrical product reaches a predetermined value preferrably about 350° C.–1200° C., it is exposed to oxygen or a mixture of gases containing oxygen. The aluminum foil then undergoes rapid oxidation and produces a very high temperature, for example about 1800° C. which effects the thermal decomposition of PCB.

The first step requires a temperature range of about 350° C.–1200° C. A lower temperature than about 350° C. hinders the rapid oxidation of aluminum foil in the second step. The preferred minimum temperature in the first step is 500° C. At this temperature, the aluminum foil is rapidly oxidized in an atmosphere of air. A pure oxygen atmosphere results in a faster reaction. The higher the temperature used in the triggering of the rapid oxidation of aluminum foil, the better the result obtained. However, as the heating temperature increases to about 1200° C., the above mentioned drawbacks become more severe. The upper limit of the heating temperature in the first step should not exceed about 1200° C. The preferred maximum heating temperature in the first step is about 1000° C.

The thermal decomposition and the rapid oxidation of the aluminum foil removes the PCB which remains in the carbonized insulating paper.

The invention is further illustrated in the following examples, which should not be construed, however, to restrict the invention.

EXAMPLE 1

An aluminum-foil capacitor, with its casing removed, was subjected to dry distillation in a vacuum, until the insulating paper was completely carbonized. A 90 gram carbonized sample was heated to 980° C. in an argon gas filled container. Then, the sample was exposed to air resulting in an exothermic reaction.

A solvent extraction test according to Notification No. 13 of the Japanese Environment Agency of 1973 was performed on the samples before and after the above thermal treatment, giving the result listed in Table 1.

TABLE 1

| Sample | PCB content (mg/kg) |
|---|---|
| Before the test | 17.6 |
| After the test | <0.005* |

*0.005 mg/kg is the identification limit.

A water extraction test (according to the Japanese criteria for land reclamation), was performed on the samples after the thermal treatment. PCB was not detected in the tests.

EXAMPLE 2

The procedure described in Example 1 was repeated except the sample was heated to 800° C. and then exposed to pure oxygen instead of air. Measurement with an optical pyrometer indicated the temperature of the sample to be at least 1800° C.

The sample was subjected to the similar tests as in Example 1. PCB was not detected in the test samples.

EXAMPLE 3

The procedure described in Example 1 was repeated except that the sample was heated to 350° C. and subsequently exposed to pure oxygen. The sample at 350° C. did not readily start the reaction and required a very strong blow of pure oxygen to start the reaction.

EXAMPLE 4

The procedure described in Example 1 was repeated except that the sample was heated to 400° C. and subsequently exposed to pure oxygen. The sample at 400° C. did not readily start the reaction and required a considerably hard blow of pure oxygen to start the reaction.

EXAMPLE 5

The procedure described in Example 1 was repeated except that the sample was heated to 500° C. and subsequently exposed to pure oxygen. The sample at 500° C. easily started the reaction.

Examples 3–5 demonstrate that 500° C. is the preferred temperature when pure oxygen is used for the dry distillation step.

I claim:

1. A method of treatment to remove harmful material from an electric product containing aluminum foil and insulating paper impregnated with poly-chlorinated-biphenyl which comprises:
    (a) burning or dry distilling the product in the absence of oxygen to a temperature of about 350° C. to 1200° C.; and subsequently
    (b) exposing the heated product to oxygen or a mixture of gases containing oxygen in order that the aluminum oxidizes rapidly generating temperatures of about 1800° C.

2. A method as described in claim 1 which comprises heating the electrical product in step (a) to a temperature of 500° C. to 1000° C.

* * * * *